March 24, 1953  E. L. FORTNER ET AL  2,632,200
POULTRY HEAD REMOVER
Filed Oct. 18, 1950
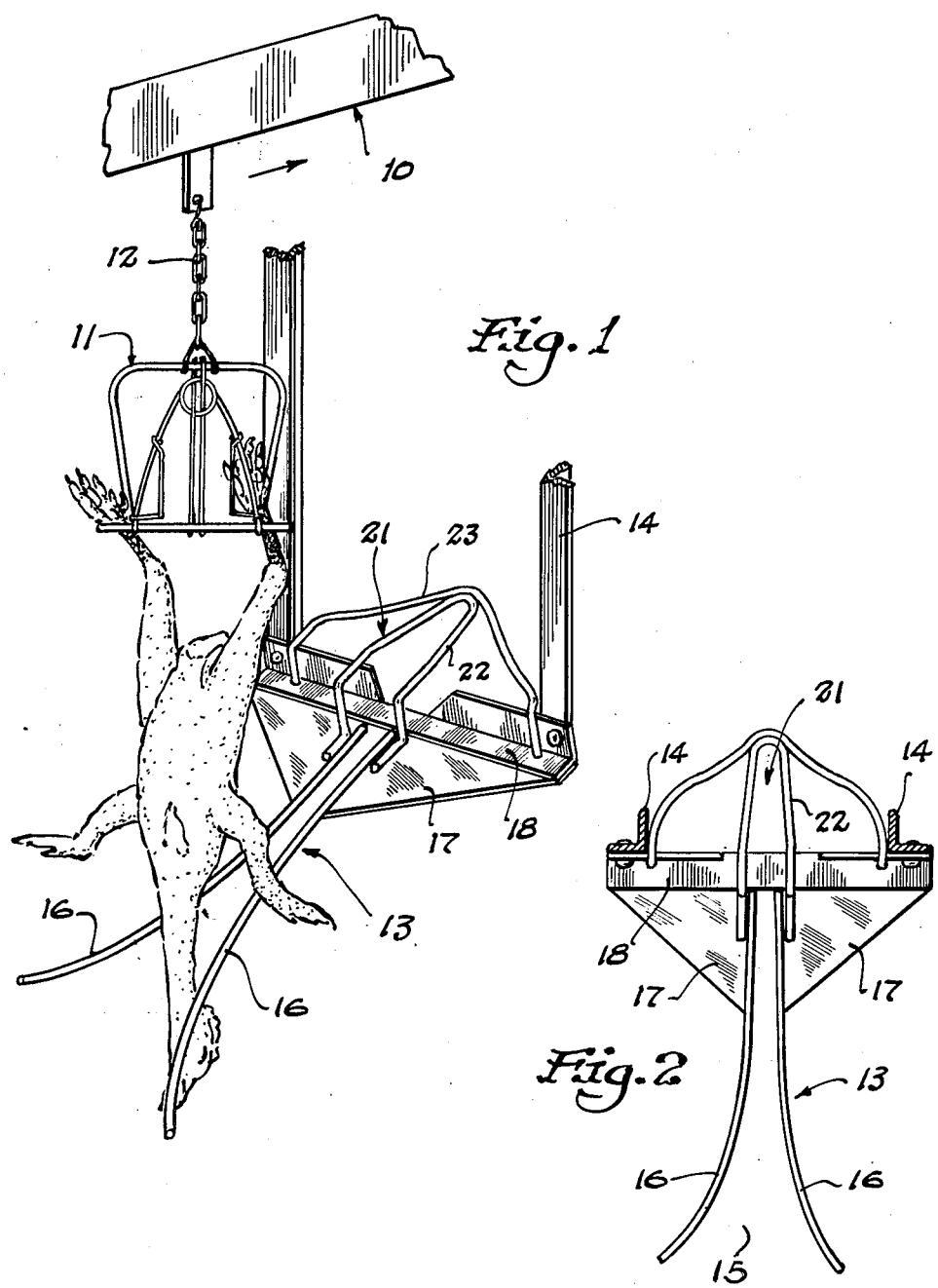
INVENTOR.
Eddie L. Fortner
Walter S. Stevenson
BY R. S. Story
ATTORNEY Patented Mar. 24, 1953

2,632,200

UNITED STATES PATENT OFFICE 2,632,200

POULTRY HEAD REMOVER

Eddie Lee Fortner and Walter S. Stevenson, Gainesville, Ga., assignors to Swift & Company, Chicago, Ill., a corporation of Illinois Application October 18, 1950, Serial No. 190,826

7 Claims. (Cl. 17—12)

1

The present invention relates to a method and apparatus for detaching the heads of poultry and is particularly adapted for use in poultry-dressing plants utilizing conveyors for the continuous processing of the birds.

In businesses which dress more than a nominal volume of poultry, the general practice is to support each bird by an individual shackle attached to the legs of the birds, which shackles are moved by a power-driven conveyor. The conveyor moves the birds through a scalding tank to loosen the feathers and through a mechanical picker to remove the feathers.

Heretofore it has been common to station a worker along the path of the conveyor at a given point whose job it was to cut the heads from the birds. This was usually done either with a knife or a pair of shears.

The principal object of the present invention is to provide a simple device to detach the heads from the birds as they move along such a processing line and to reduce the processing costs by eliminating the necessity of providing an extra worker to perform this job.

A particular advantage of the present invention is the uniformity with which the heads are detached. With a worker doing the job, there is an understandable variation in the removal of the heads of the various birds processed. The present invention detaches the head of each bird at the base of the skull. Thus, each and every bird is uniform as to processing.

Additional objects and advantages include: A device which is readily adapted for use with existing installations; a device which adds no working parts to the existing installation and which thereby does not increase the maintenance and repair costs; a device which may be readily fabricated by simple metal-working operations and which is low in first cost; and a device which will detach the heads of all of the birds without any skips.

Additional objects and advantages will become apparent from the following description taken in conjunction with the drawings, in which:

Fig. 1 is a perspective view of an embodiment of the invention; and

Fig. 2 is a plan view of the embodiment of Fig. 1.

In plants which process substantial quantities of poultry, it is customary for the birds to be carried through the scalding bath and mechanical picker by an overhead conveyor, generally 10, to which is attached a shackle 11 by means of a chain 12. The shackle grips the legs of the birds as illustrated in Fig. 1, and they hang downwardly therefrom.

To detach the heads of the birds, the present invention utilizes a V-shaped, forked member, generally 13, positioned to intersect the line of movement of the birds along the conveyor. The forked member 13 is supported by a frame 14. The substantially V-shaped opening 15 provided by member 13 is pointed in the general direction of the line of movement of the birds carried by the conveyor 10. The forked member is positioned in a plane substantially normal to the necks of the birds as they are moved by the conveyor and at a level such that the necks of the birds will enter the internal V-shaped opening.

In the embodiment illustrated, the forked member 13 is formed of a pair of $\frac{1}{2}''$ metal rods 16 attached to a horizontal plate 17 secured to a pair of angle irons 18 forming a part of frame 14. The ends of the rods 16 adjacent the angle irons 18 are spaced approximately $\frac{5}{8}$ of an inch apart and approximately $11\frac{1}{2}''$ below the shackle 11, while the projecting opposite ends of the rods are spaced approximately 10'' apart and about $13\frac{1}{2}''$ below the shackle 11.

The rods 16 are approximately 20'' long so that the incline of the rods from one end to the other is relatively small and the rods, in fact, are in a position substantially normal to the position of the necks of the birds as the latter are moved by the conveyor. The upward slant of the forked member 13 provides for the differences in the size of the poultry which may be processed. On the larger sized birds the rods 16 tend to cause the bodies of the birds to ride upwardly thereon as the birds traverse the forked member so that the necks of the birds are secured within the opening. The shackles 11 are affixed to the legs of each of the birds in about the same position so that the only variation is in the size of the birds.

As the power-driven conveyor 10 continues to move the shackle and legs of the bird along its normal path of movement, the portion of the neck adjacent the head is engaged within the V-shaped opening. The head, being substantially larger than the rearward portion of the opening, is prevented from passing therethrough, and the pull that is applied to the bird by the conveyor detaches the head from the neck of the bird. A suitable container may be placed under the device to receive the detached heads.

In some instances, depending upon the speed of the conveyor 10 and the space between the shackle 11 thereon, several birds may pile up at the forked member 13, with the result that the neck of one of the birds, generally the rearward bird in such a pile, may not enter the outer end of the V-shaped opening whereupon as that bird approaches the angle iron 18 end of the opening, the head will not be detached from the bird.

To insure that there will not be any skips for such a reason, we provide a second forked member, generally 21, above and to the rear of the first forked member 13 with respect to the line of movement of the birds along the conveyor. The second forked member is made of a ½" rod 22 suitably braced by a second rod 23. The spaced ends of rod 22 are attached to plates 17 to either side of the base of the V-shaped opening in member 13. If the neck of a bird tends to fall outside the V-shaped member 13 and rides up over plate 17, it will be directed into the open end of the second forked member 21 by the movement of the conveyor. Upon reaching the narrow end of forked member 21, the head will be held below the opening between the rods, and the continued movement of shackle 11 by conveyor 10 will detach the head from the bird.

Those familiar with the processing of poultry will realize that the present invention is ideally adapted for installation with existing processing equipment. It occupies little space and neatly and positively detaches the head from each of the birds carried by the overhead conveyors. The forked member 13 serves as a retaining means to prevent the continued movement of the head of the bird at a given point along the path of movement of the conveyor and in combination with the conveyor, which continues to move the remainder of the birds, neatly detaches the head from the neck of the bird.

We claim:

1. In a device for detaching the heads of poultry during the process of dressing the same, the combination of a conveyor to support the individual birds by a portion thereof and to move them along a given path, and retaining means intersecting the part of the path traversed by the necks of the birds, said means having an opening sufficient to receive the necks of the birds with the heads to one side thereof and the bodies of the birds to the other side thereof, said opening being below the part of the path traversed by said portion of the bird, said opening being sufficiently small to prevent the heads from passing from one side to said other side of said retaining means whereby the necks of each bird will become lodged in said opening as said birds are moved by said conveyor, and the continued movement of said portion will separate the head from the body of the bird.

2. In a device for detaching the heads of poultry during the process of dressing the same, the combination of a conveyor to support the individual birds by a portion thereof and to move them along a given path in a predetermined direction, and retaining means including a forked member with a generally V-shaped opening therein intersecting the part of the path traversed by the necks of the birds with said member being in a plane substantially normal to the position of the necks as the birds traverse said part, said member being below the part of the path traversed by said portion of the birds, the V of said member pointing substantially in said direction whereby the necks of each bird will become lodged in said opening as said birds are moved by said conveyor, and the continued movement of said portion will separate the head from the body of the bird.

3. In a device for detaching the heads of poultry during the process of dressing the same, the combination of a conveyor to support the individual birds by the legs thereof with the remainder of the birds hanging downwardly therefrom and to move them along a given path in a predetermined direction, and retaining means including a forked member with a generally V-shaped opening therein intersecting the portion of the path traversed by the necks of the birds with said member being in a plane substantially normal to the position of the necks of the birds traversing said part, the V of said member pointing substantially in said direction whereby the necks of each bird will become lodged in said opening as said birds are moved by said conveyor and the continued movement of the legs of the birds by said conveyor will separate the head from the body of the bird.

4. In a device for detaching the heads of poultry during the process of dressing the same, the combination of a conveyor to support the individual birds by the legs thereof with the remainder of the birds hanging downwardly from said legs and to move them along a given path in a predetermined direction, and retaining means including a pair of forked members with generally V-shaped openings therein, the first of said members with reference to said direction intersecting the part of the path traversed by the necks of the birds, the second of said members being beyond with reference to the direction of movement of the conveyor and above the first of said members, said members being in planes substantially normal to the position of the necks as the birds traverse said part, the V's of said members pointing substantially in said direction.

5. In a device for detaching the heads of poultry during the process of dressing the same, the combination of a conveyor means to support the individual birds by the necks thereof with the remainder of the birds hanging downwardly therefrom and to move them along a given path in a predetermined direction, said conveyor means including shackles to be secured to the legs of the birds to support the birds from the conveyor, and retaining means including a forked member with a generally V-shaped opening therein with the V of said member pointing substantially in said direction, the open end of said forked member being a distance below said shackle, which distance is approximately equal to the distance between the shackle and the neck of the largest birds supported thereby for processing, the other end of said V-shaped, forked member being positioned a distance below said shackles, which latter distance is approximately the distance between the shackle and the necks of the smallest birds supported thereby for processing whereby the necks of the various sized birds processed will become lodged in said opening by the movement of said conveyor and the continued movement of said shackle and bird will separate the head from the body of the bird.

6. A device for detaching the heads of poultry during the process of dressing the same for use with a conveyor adapted to support the individual birds by a portion thereof and to move them along a given path, said device including retaining means intersecting the part of the path traversed by the necks of the birds, said means having an opening sufficient to receive the necks of the birds with the heads to one side thereof and the bodies of the birds to the other side thereof, said opening being below the part of the path traversed by said portion of the bird, said opening being sufficiently small to prevent the heads from passing from one side to said other side of said retaining means whereby the necks of each bird will become lodged in said opening as said birds are moved by said conveyor, and the continued movement of said portion will separate the head from the body of the bird.

7. A device for detaching the heads of poultry during the process of dressing the same for use with a conveyor adapted to support the individual birds by a portion thereof and to move them along a given path in a predetermined direction, said device comprising retaining means including a forked member with a generally V-shaped opening therein intersecting the part of the path traversed by the necks of the birds with said member being in a plane substantially normal to the position of the necks as the birds traverse said part, said member being below the part of the path traversed by said portion of the birds, the V of said member pointing substantially in said direction whereby the necks of each bird will become lodged in said opening as said birds are moved by said conveyor, and the continued movement of said portion will separate the head from the body of the bird.

EDDIE LEE FORTNER.
WALTER S. STEVENSON.

REFERENCES CITED

The following references are of record in the file of this patent:

UNITED STATES PATENTS

| Number | Name | Date |
| --- | --- | --- |
| 873,436 | Holdren | Dec. 10, 1907 |
| 1,356,942 | Rece | Oct. 26, 1920 |
| 1,589,100 | Boch | June 15, 1926 |
| 2,243,951 | Gehlke | June 3, 1941 |
| 2,310,881 | Swanson | Feb. 9, 1943 |